(12) United States Patent
Mitchell et al.

(10) Patent No.: US 8,292,228 B2
(45) Date of Patent: Oct. 23, 2012

(54) CONTROL SYSTEM FOR DIMMABLE WINDOWS

(75) Inventors: Bradley J. Mitchell, Snohomish, WA (US); Bret L. Lamoree, Woodinville, WA (US); Brock J. Prince, Seattle, WA (US); Henry V. R. Fletcher, III, Everett, WA (US)

(73) Assignee: The Boeing Company, Chicago, IL (US)

( * ) Notice: Subject to any disclaimer, the term of this patent is extended or adjusted under 35 U.S.C. 154(b) by 151 days.

(21) Appl. No.: 11/694,013

(22) Filed: Mar. 30, 2007

(65) Prior Publication Data
US 2008/0239451 A1    Oct. 2, 2008

(51) Int. Cl.
*B64C 1/14* (2006.01)
*B60J 1/00* (2006.01)
(52) U.S. Cl. .................... 244/129.3; 296/96.16
(58) Field of Classification Search ............ 701/36, 701/33; 359/265, 614; 244/129.3; 296/96.16
See application file for complete search history.

(56) References Cited

U.S. PATENT DOCUMENTS

| | | | |
|---|---|---|---|
| 4,564,789 A | 1/1986 | Kukubu | |
| 4,832,468 A | 5/1989 | Ito et al. | |
| 4,893,062 A | 1/1990 | D'Aleo et al. | |
| 6,039,390 A * | 3/2000 | Agrawal et al. | 296/211 |
| 6,316,889 B1 | 11/2001 | Chansky et al. | |
| 6,454,759 B2 * | 9/2002 | Krulevitch et al. | 604/891.1 |
| 7,111,952 B2 | 9/2006 | Veskovic | |
| 7,113,852 B2 * | 9/2006 | Kapadia et al. | 701/33 |
| 2003/0014091 A1 * | 1/2003 | Rastegar et al. | 607/61 |
| 2005/0200934 A1 * | 9/2005 | Callahan et al. | 359/265 |

OTHER PUBLICATIONS

GB0804804.3, Combined Search and Examination Report, May 23, 2008.

* cited by examiner

*Primary Examiner* — Glenn Dayoan
*Assistant Examiner* — Melissa Black
(74) *Attorney, Agent, or Firm* — Parsons Behle & Latimer

(57) ABSTRACT

Electrically dimmable windows for aircraft are powered by energy harvesting devices on-board the aircraft. The harvested energy is stored and used to control the opacity of the windows based on individual window opacity settings selected either by passengers or a cabin attendant. Each window has an associated control circuit that controls the electrical power applied to the window based on the selected opacity setting. The control circuit includes a low energy usage processor that remains in a sleep mode until a change in the opacity setting is detected. Each control circuit may include a radio transceiver that receives control signals from a transmitter operated by the cabin attendant in order to simultaneously remotely control the opacity settings of multiple windows.

32 Claims, 4 Drawing Sheets

CONTROL SYSTEM FOR DIMMABLE WINDOWS

TECHNICAL FIELD

This disclosure generally relates to electrically dimmable windows, and deals more particularly with a system for powering and controlling dimmable windows using energy harvesting devices on-board vehicles, such as aircraft.

BACKGROUND

Electrically dimmable windows rely on electrical power which is applied to special materials in the windows in order to change the opacity of the windows. Several technologies may be used to construct electrically dimmable windows, including thermotropics, photochromics, photochromatics, liquid crystals, reflective hydrides, suspended particle displays and electrochromics.

Electrically dimmable windows have been purposed for use in aircraft in order to control interior cabin illumination. Previously, passengers used sliding plastic screens covering individual windows in order to control cabin illumination from natural light.

The use of electrically dimmable windows in aircraft increase electrical power demands for on-board systems, as well as the need for additional wiring to connect each window with a power source. The need for this additional wiring renders it expensive to retrofit existing aircraft with electrically dimmable windows. Moreover, existing window systems do not allow for central control of all of the windows on an aircraft by a pilot or cabin attendant. Accordingly, a cabin attendant must request each passenger, typically through a PA announcement, to change window shade settings during landing, takeoff or during flight, as when it is necessary to dim the cabin in order to allow passengers to view a movie, or sleep.

Accordingly, there is a need for a dimmable window system for vehicles such as aircraft which overcomes the problems discussed above. The present disclosure is intended to satisfy this need.

SUMMARY

A dimmable window system for vehicles such as aircraft is powered by energy harvesting devices on-board the vehicle, thereby reducing on-board power requirements. The harvested energy is stored as electrical power in a storage device such as a battery or capacitor. A control circuit controls the opacity of a window using electrical power drawn from the storage device. The control circuit may also include a radio receiver which receives window dimming control signals from a transmitter operated by a cabin attendant or pilot, thereby permitting central control of all windows on-board the vehicle.

In accordance with one illustrated embodiment, a dimmable window system is provided, comprising: at least one window having electrically controlled opacity; an electrical power storage device for supplying electrical power used to control the opacity of the window; and, a control circuit coupled with the window and the storage device for controlling the opacity of the window. The system may further comprise a device for harvesting energy and converting the harvested energy to electrical power. The control circuit may include a power conditioning circuit for conditioning electrical power from the energy harvesting device before the power is stored in the storage device. The electrical power storage device may be a capacitor or a battery. The control circuit may include a window dimming adjustment control for selecting a level of opacity of each window. The control circuit may further include a microcontroller that periodically awakens from a sleep mode to search for window dimming adjustment control signals. The control circuit may include a wireless radio link that allows remote control of the opacity of all windows.

In accordance with another embodiment, a dimmable window system for vehicles is provided, comprising: a plurality of windows on a vehicle, each having electrically controllable opacity; at least one energy harvesting device for harvesting energy on-board the vehicle and generating electrical power; storage means for storing electrical power generated by the harvesting device; and, a plurality of control circuits respectively coupled with the windows, each of the control circuits being coupled with the storage means and operative for controlling the opacity of the associated window using electrical power from the storage means. The system may further comprise a controller on-board the vehicle for generating control signals used to remotely control the opacity of at least certain of the windows, and a wireless communication link between the controller and the control circuits associated with the windows, wherein the communication link is operative for delivering control signals to the control circuits associated with the windows. Each of the control circuits may include a window dimming adjustment control for selecting a level of opacity of the associated window, and a processor responsive to the adjustment control for controlling the delivery of electrical power from the storage means to the window. The energy harvesting device may include, for example, a device for converting a temperature gradient into electrical power, a device for converting motion into electrical power, or a device for converting radiation into electrical power. The device for converting radiation into electrical power may include a photovoltaic device for converting light into electrical power. The control circuits may include a microcontroller for altering the level of power applied to the window. The wireless data link may include a radio transmitter for transmitting the control signals, and a radio receiver at each of the windows for receiving the control signals from the transmitter.

In accordance with another embodiment, a method is provided for controlling electrically dimmable windows on-board an aircraft. The method comprises the steps of: harvesting energy on-board the aircraft; storing the harvested energy as electrical power; and, using the stored electrical power to control the opacity of the windows. Energy harvesting may be performed by converting a temperature gradient into electrical power, or converting motion into electrical power, or converting radiation into electrical power. The conversion of radiation into electrical power may be performed using a photovoltaic device to convert light into electrical power.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
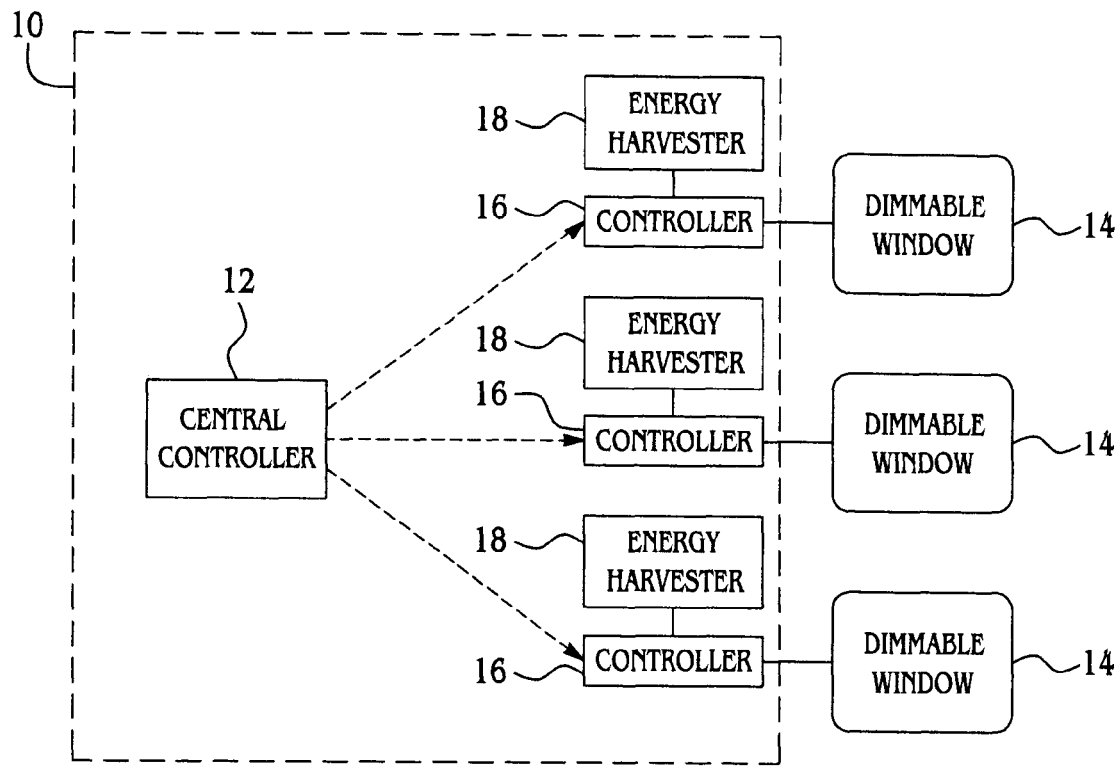
FIG. 1 is a block diagram illustration showing a control system for dimmable windows in accordance with one embodiment.

Referring first to FIG. 1, a control system 10 is provided for controlling one or more dimmable windows 14 on a vehicle (not shown), such as a commercial aircraft. The dimmable windows 14 are typically located in the fuselage of the aircraft at cabin locations where illumination from natural light is desired, or where a view to the outside is desired. The dimmable windows 14 may be constructed using any of various technologies previously described, including those using an electrochromatic membrane which changes opacity based on an applied electric charge. The electrical charge, and thus the opacity of the window, may be varied by applying a voltage of positive or negative polarity across the membrane. In one embodiment, the window 14 holds its opacity state when no electric charge is applied to the membrane. Typically, the window 14 increases its opacity when an electrical voltage is applied of one polarity, and decreases its opacity when an electrical voltage is applied of the opposite polarity. In effect, the dimmable window 14 may be thought of as a large capacitor whose electric charge may be varied. In one embodiment, the range of applied voltages may be from −1.2V to +1.2V, where −1.2V yields a transparent window, and +1.2V yields an opaque window.

The voltage applied to each of the dimmable windows 14 is controlled by an associated controller 16 using electrical energy produced by an energy harvesting device 18. The energy harvesting device 18 may comprise, by way of example and without limitation, a thermoelectric energy harvesting device that generates electrical power from a thermal gradient on-board the aircraft. For example, a thermoelectric energy harvesting device may be placed between two solid materials of different temperatures or between a solid and a fluid at different temperatures to generate electricity. In the case of aircraft, such surfaces include the aircraft fuselage structure, the aircraft window frame structure, the window exterior surface, various window inner panes (including the electrochromatic dimming surface itself), the sidewall panel and heat sinks that may be placed in air spaces such as the air between the side wall panel and the insulation blankets or the air spaces between the window inner panes. These thermoelectric devices take advantage of the temperature extremes experienced by the aircraft while cruising at high altitudes, and to a lesser degree during warm days and nights while on the ground. A thermoelectric energy harvesting device of the type described above may be integrated into a stringer clip to generate electricity from the temperature differential across the aircraft insulation blankets.

Other types of energy harvesting devices 18 are contemplated. For example, an energy harvesting device 18 may be employed that converts radiation into electrical power. One example of such a device is a photovoltaic device, also known as a solar cell, that converts light energy (photons) into electrical power. Sources of light energy near passenger windows on aircraft include solar radiation and cabin lighting. The energy harvesting device 18 may comprise a device for converting motion into electrical power. For example, piezoelectric or electrodynamic devices may be used to harvest energy, by converting vibration and motion energy into electricity. Vibration/motion energy exist near passenger windows in the form of aircraft skin vibration, side wall panel vibration and aircraft turbulence motion. It should be noted here that the energy harvesting device 18 may comprise a combination of any of the energy conversion devices discussed immediately above As will be discussed in more detail below, the controller 16 is responsive to dimming adjustment controls operated by a passenger at a window 14 for controlling the opacity of the window 14 using electrical power generated by the energy harvester 18. Thus, each of the passengers adjacent one of the windows 14 may independently adjust window opacity using individual controls. Alternatively, however, one or more of the dimmable windows 14, or all of the dimmable windows 14 may be controlled by a central controller 12 on-board the aircraft, operated by a pilot or cabin attendant. Accordingly, a pilot or cabin attendant may override opacity settings selected by passengers so as to fully dim or lighten the windows 14 in order to prepare the aircraft for landing or takeoff, and for the overall comfort of passengers as where the cabin needs to be dimmed to allow passengers to sleep or view a movie. As will be discussed later in more detail, the central controller 12 operates the dimmable windows 14 through a wireless data link, thus obviating the need for wiring to connect the windows 14 to the central controller 12.

Figure 2:
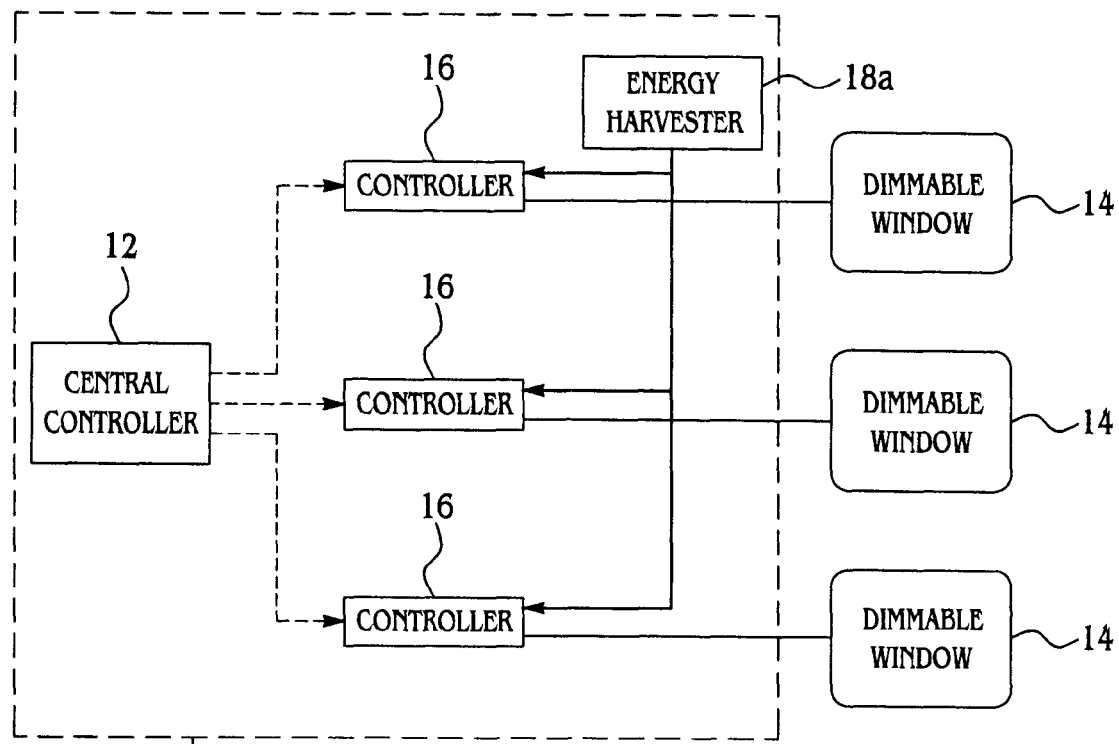
FIG. 2 is a block diagram illustration of an alternate embodiment of the control system.

FIG. 2 depicts an alternate control system 10a in which a single energy harvester 18a is coupled with controllers 16 in order to control multiple windows 14.

Figure 3:
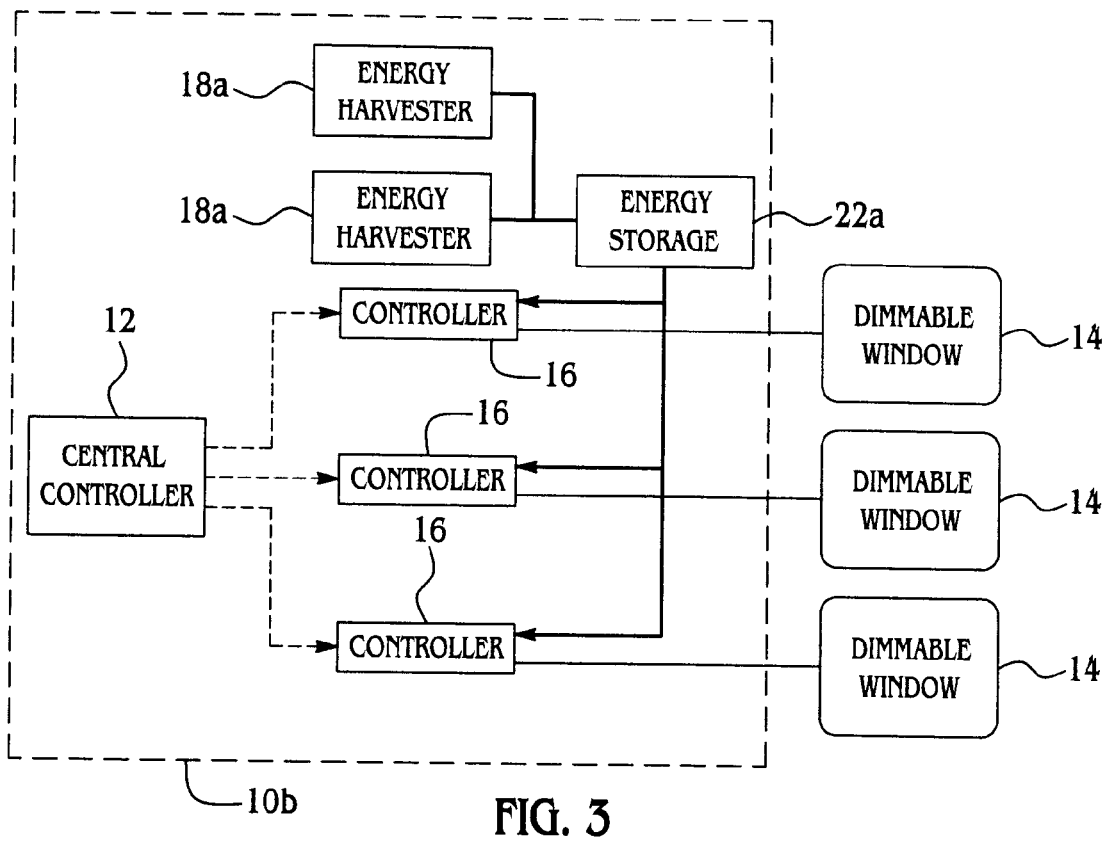
FIG. 3 is a block diagram illustration of another embodiment of the control system.

Another embodiment of the control system 10b is shown in FIG. 3 wherein multiple energy harvesters 18a generate electrical power that is stored in a single energy storage device 22a. In this embodiment, multiple dimmable windows derive power from a single energy storage device 22a which may comprise a battery or capacitor, for example.

In still other embodiments, one of the controllers 16 may be used to control more than one of the dimmable windows 14.

Figure 4:
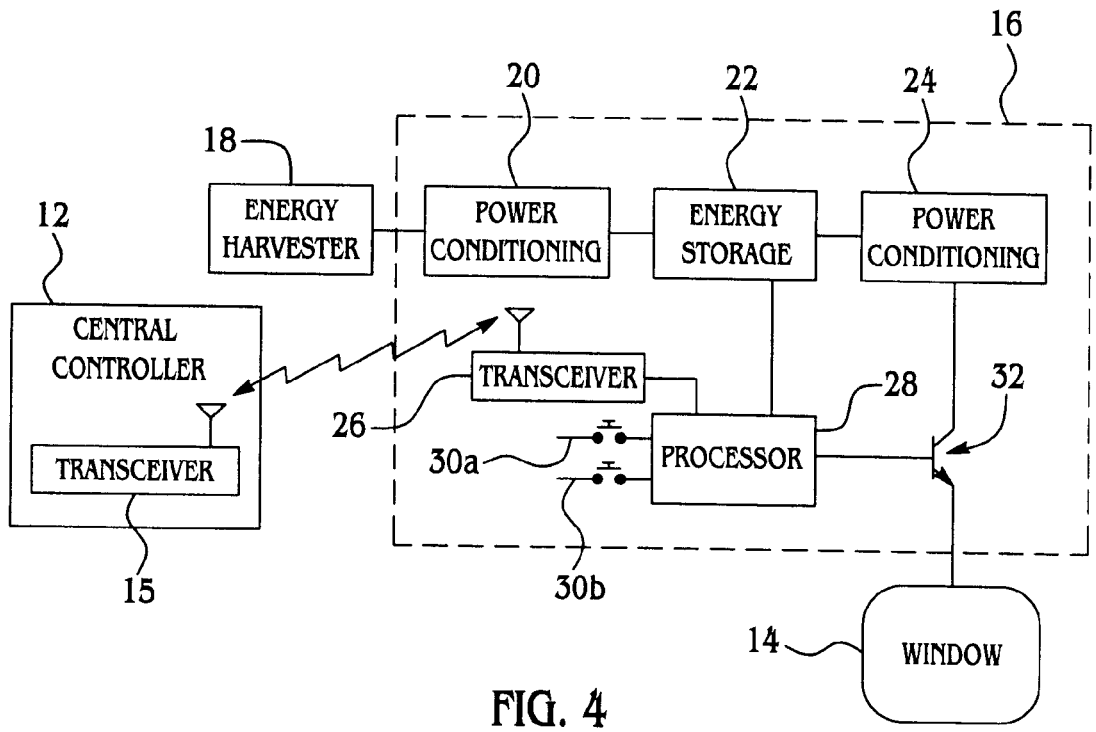
FIG. 4 is a combined block and schematic illustration showing additional details of a control circuit used in the system shown in FIG. 1.
Figure 5:
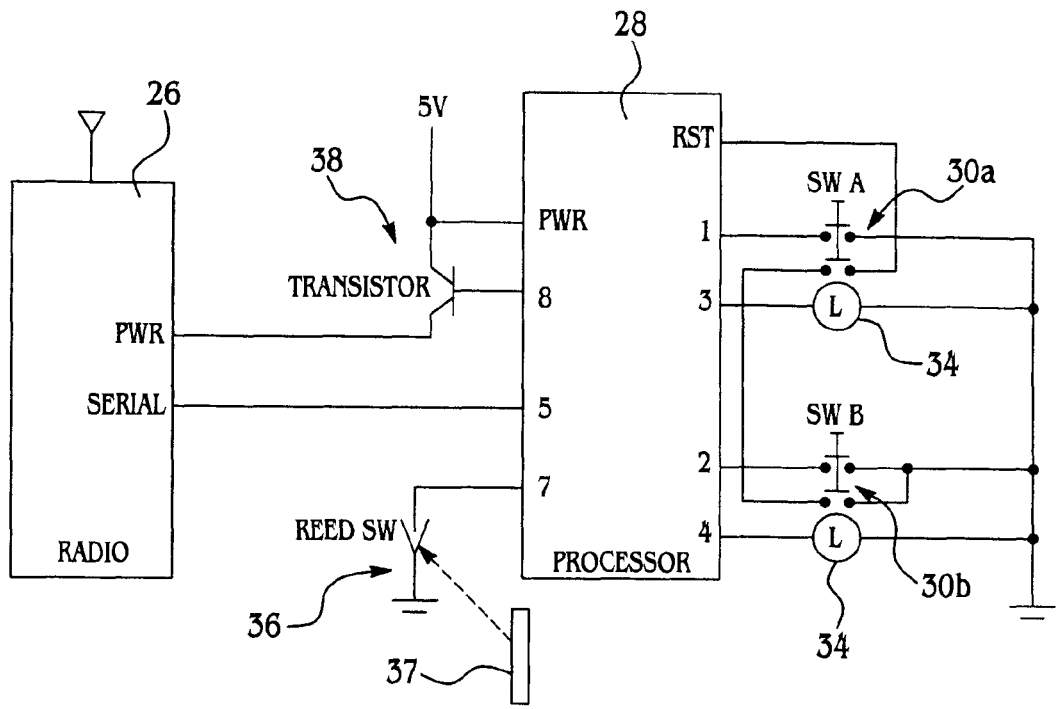
FIG. 5 is a combined block and schematic illustration showing further details of the control circuit shown in FIG. 4.

Referring now simultaneously to FIGS. 1 4 and 5, each of the controllers 16 comprises a control circuit broadly including a first power conditioning circuit 20, an energy storage device 22, a second power conditioning circuit 24, a processor 28, a radio transceiver 26 and a pair of passenger-operated push button control switches 30a, 30b.

The central controller 12 includes a wireless transceiver 15 that communicates with the radio transceiver 26 forming part of each of the controller 16. The power conditioning circuit 20 receives energy from the energy harvester 18 and functions to condition this energy and trickle charge the energy storing device 22. A similar power conditioning circuit 24 maybe used to condition power used by the window 14, such as to provide power at specific voltages used to control the opacity of window 14. The processor 28 controls the flow of electrical power from the storage device 22 to the window 14 using a switching transistor 32. The energy storage device 22 may comprise a rechargeable battery or a super capacitor which receives conditioned power from the power conditioning circuit 20.

The processor 28 is powered using electrical power stored in the energy storage 22, and operates in any of four modes described below. The processor 28 may comprise a programmed microcontroller such as a Parallax BS2pe or a Texas instruments MSP430. The processor 28 may be programmed to maintain itself in a low power, "sleep" mode most of the time so as to draw minimal power from the storage device 22.

The processor 28 is programmed to periodically awaken from the sleep mode to check for broadcast radio communications signal from the central controller 12. When awakened, the processor 28 temporarily powers up the radio transceiver 26 to listen for signals from the transmitter 15. If such messages are present from the central controller 12, the processor 28 responds by carrying out the instructions contained in the transmitted message. These instructions may include, by way of example and without limitation, setting the window 14 to minimum opacity, setting the window 14 to maximum opacity, changing the passenger control set points or switching into a power down mode. After these instructions have been carried out, the processor 28 returns to the sleep mode.

The processor 28 may be programmed to awaken from the sleep mode on a periodic basis, for example every two seconds. In this case, each broadcast command from the central controller 12 would be broadcast continuously for at least two seconds in order to assure every window 14 will be awakened at least once during the duration of the broadcast from the central controller 12 and therefore have a chance to receive the command. In some embodiments, the control circuit 16 may require several milliseconds to check for broadcast messages from the central controller 12. It may thus be appreciated that each control circuit 16 remains in a low power sleep mode the majority of the time, and is awakened only to listen for possible commands from the central controller 12, or respond directly to a passenger request to change the opacity setting of the window 14.

It should be noted here that because the processors 28 in all of the windows 14 awaken and respond to broadcast commands from central controller 12 at different times (up to two seconds apart in the illustrated example), the processors 28 commence their operations at slightly different times. Because these actions may take several seconds to complete (e.g. transition from minimum to maximum opacity, for example), the delay in certain windows will not be normally noticeable to passengers, particularly since each window 14 may be transitioning from different opacity points which will tend to camouflage the time disparities between the windows 14.

Each of the processors 28 may also adjust a setting in its memory in response to broadcasted commands from the central controller 12 that require the processor 28 to respond in different ways to later inputs at control buttons used by passengers to change opacity settings. For example, if the central controller 12 sends a signal to the control circuits 16 to indicate that the passenger cabin is switching into a nighttime mode to facilitate movie watching or sleeping, a "minimum allowable opacity set point" variable in the memory of the processor 28 may be adjusted which later restricts the passenger's control of the window to a range of, for example, 95-100% of opacity. This function may be used, for example, to restrict the range of operation of the window 14 to 95-100% opacity (instead of 0-100% opacity) when the cabin crew wishes to configure the cabin to accommodate passenger sleeping or movie watching, while still allowing some degree of visibility through the windows 14.

The processor 28 also operates in a passenger control mode, in which the processor 28 is programmed to awaken anytime a passenger presses one of the passenger control buttons 30a, 30b used to change the opacity of window 14. When awakened, the processor 28 begins changing the opacity of window 14 in the direction corresponding to which of the buttons 30a, 30b has been pressed, until the passenger releases the button or until the window 14 has reached a predefined opacity set point, or maximum or minimum opacity levels. For example, a passenger may press a darken button (e.g. 30b) twice in order to darken the window 14 two set points darker. In this example, the processor 28 may flash an LED 34 (or 74 in FIG. 8) adjacent to a symbol on the control interface in order to indicate the target set point while the processor 28 operates to darken the window 14 to that selected set point.

Finally, the processor 28 may operate in a power down mode. In response to a command signal from the central controller 12, the processor 28 transitions into a semi-permanent, low power sleep mode or, alternatively may completely shut down. This mode may be entered, for example, when passenger control of the windows 14 is not necessary or desired. This mode may be used between flights, for example, anytime the aircraft is powered down, during aircraft overnight storage and/or during aircraft long term storage. In this mode, very little or no power is drawn from the energy storage device 22, if the storage device 22 continues to be trickle charged by any available energy from the energy harvesting device 18.

The power down mode of the processor 28 may be ended, for example, by pressing both passenger control buttons 30a, 30b simultaneously. The processor 28 may then power up the radio transceiver 26 in order to check for broadcast commands from the central controller 12. If a broadcast command is received by the radio transceiver 26, the processor 28 switches into the airplane control mode and carries out operations consistent with the command from central controller 12. If no such broadcast command is present from central controller 12, then the processor 28 may re-enter the sleep mode. It may thus be appreciated that the power down mode for the processor 28 allows the control system to draw no or minimal power when the dimming function for the window 14 is not needed.

Additional techniques may be used to further reduce the power consumption of the windows 14 and associated controller 16. For example, the processor 28 may be programmed to apply a short circuit across the window 14 in order to drive it toward 0 V in lieu of driving the window 14 to or through 0 V by applying an energy-consuming charge to the window 14. Also, energy recovery may be employed as the window 14 is driven toward 0 V, by programming the processor 28 to temporarily connect the window 14 to the input side of the first power conditioning circuit 20.

Figure 8:
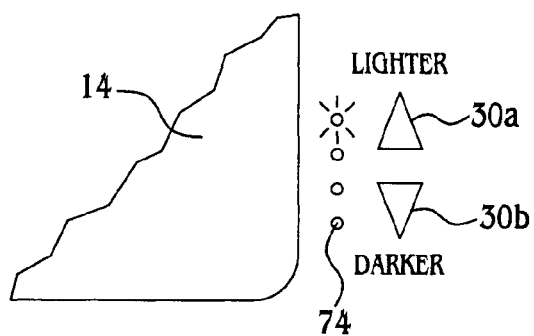
FIG. 8 is a diagrammatic illustration of a dimmable window having an alternate form of adjustment controls.

As shown in FIG. 8, the passenger control buttons 30a, 30b may be located adjacent the window 14, and may comprise momentary membrane push buttons in which one of the buttons (30a) functions to lighten the window 14, while the other button 30b functions to darken the window 14. Indicator lights 74 may be optionally provided to provide a continuous or momentary indication of the opacity of the window 14 or the target opacity set-point toward which the window 14 is moving. The passenger selection buttons 30a, 30b allows the passenger to control window capacity in a continuous range or incremental steps.

Referring particularly now to FIG. 5 the processor 28 is powered by five volts derived from the storage device 22 and applied to the PWR pin on processor 28. As indicated above, the processor 28 typically draws little or no current from the storage device 22 while in the sleep mode and even less or no power during the power down mode. When the processor 28 periodically awakes, it delivers a signal on pin 8 which turns on the switching transistor 38, thereby coupling power to the radio transceiver 26, and allowing the control circuit 16 to "listen" for commands from the central controller 12.

Switches 30a, 30b, which are double pole, single throw switches (FIG. 5), are connected to pins 1 and 2, respectively of processor 28 and, as previously indicated function as passenger controls to control the opacity of window 14. Momentary closure of either switch 30a or 30b awakens the processor 28 to commence the passenger control mode. The push buttons 30a, 30b may have "up" and "down" or "lighten" and "darken" symbols printed on or near them using photoluminescent materials to allow viewing in a darkened cabin. When either button 30a or 30b is pressed, the processor begins the process of lightening or darkening the window 14. When the button 30a, 30b are released, the processor 28 terminates the process of lightening or darkening the window 14 and switches back into a sleep mode. Alternatively, pressing one of the buttons 30a, 30b may command the processor 28 to change the window 14 in preprogrammed opacity increments.

The remaining poles of switches 30a, 30b are connected to the reset pin of processor 28 and may be used to awaken the processor 28 from the power down mode. If desired, LEDs 34 may be used to illuminate membrane type switch buttons 30a, 30b when these buttons are pressed, or to visually indicate which preprogrammed set points to which the processor 28 is changing the window. This provides the passenger with visual feedback that his/her input has been received and is being processed. This feedback is especially useful for electrochromatic dimming windows that may respond slowly to changes in passenger settings.

Figure 7:
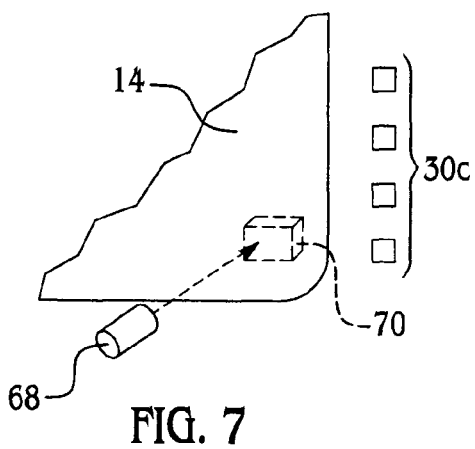
FIG. 7 is a diagrammatic illustration of a dimmable window with adjustment controls and an opacity sensor.

The processor 28 includes memory that allows "learning" the opacity state of the window by any of several methods. For example, the processor 28 may measure the electric charge on the window 14, thereby inferring the opacity of the window 14. Alternatively, as shown in FIG. 7, an illuminated diode 68 and a phototransistor 70 may be positioned on opposite sides of the window 14, and cooperate as an opacity sensor. The sensed opacity may be input to the processor 28 in order to determine and record the current window opacity.

Figure 6:
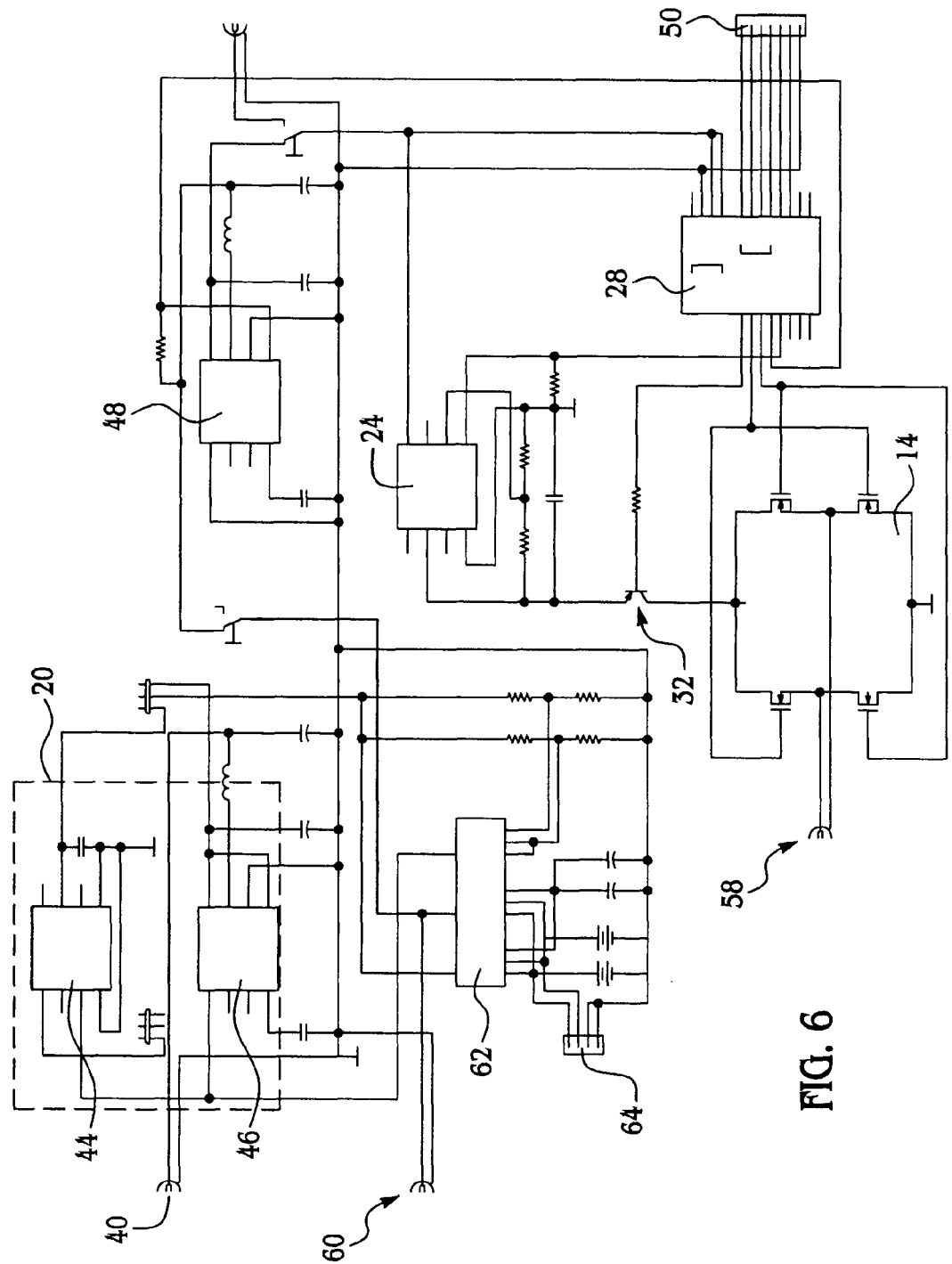
FIG. 6 is a detail schematic illustration of the control circuit.

Additional details of portions of the controller 16 are shown in FIG. 6. The energy harvesting device 18 is connected to the control circuit 16 by a connector 40. Power from the harvesting device 18 is delivered to the power conditioning circuit 20 which may comprise a buck-boost converter that increases the voltage to a desired working level, for example 2.5V-3.3V in one useful embodiment. The converter may comprise a linear voltage regulator 44 coupled with a synchronous step-up converter 46. The conditioned power is delivered through a selector switch 62 to a connector 64 that is connected with the energy storage device 22 which may comprise a nickel metal hydride battery. Power output by the conditioning circuit 20 is also delivered to a step-up converter 48 which increases the voltage of the power output by the power conditioning circuit 20 to a voltage, such as 5 volts that is suitable to power the processor 28 as well as the radio 26 when the output from the energy storage device 22 is too low to maintain this required level of voltage.

The second power conditioning circuit 24 may comprise a voltage limiter which is controlled by the processor 28 and functions to limit the voltage applied to the window 14 to a pre-selected level, for example 1.2V in one useful embodiment. A connector 50 couples the processor 28 with the previously discussed radio transceiver 26 (FIG. 5). Transistor 32 is connected between the voltage limiter 24 and the window 14, and functions to limit the current applied to the window 14 based on programmed values stored in the processor 28.

The selector switch 62 is an optional item that can be used to switch delivery of the conditioned power from the harvester device 18 to any of multiple batteries or other energy storage devices.

Various other embodiments and variations are possible. For example, other methods may be employed to end the power down mode of the processor 28. The power down mode may be ended, for example, by pressing both passenger control buttons 30a, 30b which grounds the reset pin of the processor 28. Alternatively, a magnet 37 may be held close to a reed switch 36 (FIG. 5) which grounds a pin on the processor 28. In response to either of these pins being grounded, the processor 28 will then awaken and transition into the aircraft control mode or the sleep mode. This method is advantageous in that the radio transceiver 26 is not required to be powered up and the central controller 12 does not need to broadcast during the time it takes for personnel to awaken all the windows 14 at each window location.

In another embodiment, the central controller 12 may request each of the windows 14 to perform a self-check and report back the results. This self check, which is performed by each of the processors 28, may include, for example, a complete or summarized usage history and the current state of the energy storage device 22 (e.g. current voltage level). The processor 28 may then direct the transceiver 26 to transmit this status report to the central controller 12. The central controller 12 may individually address each of the windows 14 by communicating with the associated processors 28. Each of the windows 14 may report its particular location to the central controller 12 using any of several known methods, such as that disclosed in U.S. Pat. No. 7,137,594 issued Nov. 21, 2006, owned by The Boeing Company. To assist in addressing specific windows 14, each of the controllers 16 may include a programmable device that identifies the location of the associated window 14 within a cabin. For example, the controller 16 may include a simple DIP switch (dual in-line package switches) that may be set to uniquely identify the location of the window 14. By knowing the location of the windows 14, the central controller 12 can interrogate or control specific windows 14 or groups of windows. For example, the central controller 12 may issue commands dimming all of the windows only in the first class section of the aircraft.

It should be noted here that although the illustrated central controller 12 and controller 16 each include a transceiver 15, 26 to allow full duplex communication, in some applications only simplex or one-way communication may be needed. Where only one way communication is needed, transceivers are not required. Instead, the central controller 12 may have a radio transmitter (not shown) and the controller 16 may have a radio receiver (not shown).

Another embodiment of the power down mode comprises lengthening the time by which the processor 28 is in the sleep mode, for example to a period of 10 minutes. In this embodiment, 2n order to end the power down mode, the central controller 12 would continuously transmit an "awake" message for at least 10 minutes. This method would reduce the average power consumption of the control system significantly.

Instead of lighten and darken passenger control buttons 30a, 30b shown in FIG. 8, two or more buttons 30c shown in FIG. 7 may be provided, wherein each of the buttons 30c corresponds to a specific opacity level. For example, the four push buttons 30c shown in FIG. 7 may, for example, correspond to 0%, 50%, 95% and 100% opacity levels for the window 14. In this embodiment, a passenger may for example, press the 50% button 30c. In this event, the processor 28 would then control the dimmable window 14 to a 50% opacity level. The advantage of this method is that the passenger only has to press the button momentarily and does not have to hold the button down until the desired opacity level is achieved. This embodiment is especially useful in connection with dimmable windows 14 that change slowly in opacity. Various other forms of passenger interface controls are possible, including toggling the target set point up or down on a scale of several predefined set points.

The central controller 12 may also send other commands to the window's controller 16. For example, the processor 28 may be commanded to change the color of the window 14 or to reveal an image in the window 14. The processor 28 may also be programmed to restrict the frequency of passenger interaction. For example, if the processor 28 detects that the passenger is activating the window 14 excessively, the processor 28 may initiate a "time out" mode wherein it will cease responding to all passenger commands for a set period of time, or may adjust the window opacity more slowly. The processor 28 may also monitor the voltage in the energy storage device 22 and initiate "time out" modes or slower opacity changes or initiate other energy saving modes, such as only responding to commands from the central controller 12.

Various photoluminescent materials may be applied or incorporated into the passenger control buttons 30a, 30b, 30c which respond to non-visible light sources. These non-visible light sources, such as ultraviolet light, may be included in the cabin interior lighting of the aircraft such that, even when cabin lights are turned down, this non-visible light source is present to illuminate the photoluminescent markings on the passenger control buttons 30a, 30b, 30c, thus making them visible in a darkened cabin.

Although the embodiments of this disclosure have been described with respect to certain exemplary embodiments, it is to be understood that the specific embodiments are for purposes of illustration and not limitation, as other variations will occur to those of skill in the art. For example, although the dimmable window system has been disclosed in connection with its application to aircraft, the system can be employed in other types of vehicles and in stationary applications such as in buildings.

What is claimed is:

1. A dimmable aircraft window system, comprising:
    at least one window having electrically controllable opacity;
    an electrical power storage device for supplying electrical power used to control the opacity of the window; and,
    a control circuit coupled with the window and the storage device for controlling a level of opacity of the window;
    said control circuit further comprises a first wireless transceiver onboard said aircraft, said first wireless transceiver adapted for two-way communication with a central controller onboard said aircraft, said central controller comprising a second wireless transceiver, said central controller operable to produce wireless control signals to remotely control the level of opacity of the window, said control circuit operable to transmit operational status and location information comprising an associated window to said central controller;
    said control circuit further includes a programmable processor responsive to the wireless control signals for controlling the opacity of the window, said programmable processor programmed to temporarily power up said first transceiver to periodically check for said wireless control signals broadcast from said central controller, said programming comprising instructions stored in processor-readable memory.

2. The dimmable window system of claim 1, further comprising a device coupled with the storage device for harvesting energy and converting the harvested energy to electrical power.

3. The dimmable window system of claim 2, wherein the energy harvesting device includes any of:
    a device for converting a temperature gradient to electrical power,
    a device for converting motion into electrical power,
    a device for converting radiation into electrical power.

4. The dimmable window system of claim 3, wherein the device for converting radiation into electrical power includes a photovoltaic device for converting light into electrical power.

5. The dimmable window system of claim 2, wherein the control circuit includes a power conditioning circuit for conditioning electrical power from the energy harvesting device before the electrical power is stored in the storage device.

6. The dimmable window system of claim 1, wherein the electrical power storage device is one of:
    a capacitor, and a battery.

7. The dimmable window system of claim 1, wherein the control circuit includes a power conditioning circuit for conditioning the electrical power drawn from the power storage device to control the opacity of the window.

8. The dimmable window system of claim 1, wherein the control circuit includes a window dimming adjustment control for selecting a level of opacity of the window.

9. The dimmable window system of claim 1, wherein the control circuit includes a microcontroller responsive to the operation of the window dimming adjustment control for altering the electrical power applied to the window.

10. The dimmable window system of claim 9, wherein the microcontroller includes a power saving sleep state, and an awake state initiated by the operation of the window dimming adjustment.

11. The dimmable window system of claim 1, wherein the control circuit includes a second dimming control at the window, the second dimming control being coupled with the processor and operative for selecting the level of opacity of the window.

12. The dimmable window system of claim 1, wherein the control circuit includes means for sensing the level of opacity of the window.

13. The dimmable window system of claim 1, wherein the control circuit includes a photoluminescent window dimming adjustment control for selecting a level of opacity of the associated window.

14. The dimmable window system of claim 1, wherein the control circuit includes a programmable processor that is responsive to said wireless control signals broadcast from said central controller to set control limits on control of said level of opacity of the windows, said programmable processor comprising instructions stored in processor-readable memory.

15. A dimmable window system for vehicles, comprising:
    a plurality of windows on a vehicle, each of the windows having electrically controllable opacity;
    at least one energy harvesting device for harvesting energy on-board the vehicle and generating electrical power;
    storage means for storing electrical power generated by the harvesting device; and,
    a plurality of control circuits each coupled with a respective window, each of the control circuits being coupled with the storage means and operative for controlling a level of opacity of the associated window using electrical power from the storage means;
    at least certain ones of said plurality of control circuits includes a first wireless transceiver on-board the vehicle, said first wireless transceiver adapted for two-way full duplex wireless communication with a central controller comprising a second wireless transceiver on-board the vehicle, said central controller operable to generate wireless control signals to remotely control the level, of opacity of a respectively associated window, each control circuit operable to transmit operational status and location information comprising an associated window to said central controller; and at least certain ones of said plurality of control circuits includes a programmable processor responsive to the wireless control signals, said programmable processor programmed to temporarily power up said first transceiver to periodically check for said wireless control signals broadcast from said central controller, said programmable processor comprising instructions stored in processor-readable memory.

16. The dimmable window system of claim 15, wherein each of the control circuits includes:
a window dimming adjustment control for selecting a level of opacity of the associated window, and
a programmable processor responsive to the adjustment control for controlling the delivery of electrical power from the storage means to the window.

17. The dimmable window system of claim 15, wherein the energy harvesting device includes any of:
a device for converting a temperature gradient to electrical power,
a device for converting motion into electrical power,
a device for converting radiation into electrical power.

18. The dimmable window system of claim 17, wherein the device for converting radiation into electrical power includes a photovoltaic device for converting light into electrical power.

19. The dimmable window system of claim 15, wherein each of the control circuits includes a power conditioning circuit for conditioning electrical power from the energy harvesting device before the electrical power is stored in the storage means.

20. The dimmable window system of claim 15 wherein the storage means is one of:
a capacitor, and a battery.

21. The dimmable window system of claim 15, wherein each of the control circuits includes a window dimming adjustment control for selecting a level of opacity of the associated window.

22. The dimmable window system of claim 21 wherein the dimming adjustment control include a photoluminescent material allowing the adjustment control to be visible under low lighting conditions.

23. The dimmable window system of claim 21, wherein each of the control circuits includes a microcontroller responsive to the operation of the window dimming adjustment control for altering the electrical power applied to the window.

24. The dimmable window system of claim 23, wherein the microcontroller includes a power saving sleep state, and an awake state initiated by the operation of the window dimming adjustment.

25. The dimmable window system of claim 15, wherein the control circuit includes means for sensing the level of opacity of the window.

26. The dimmable window system of claim 15, wherein at least certain ones of said plurality of control circuits includes a power conditioning circuit for conditioning the electrical power drawn from the power storage device to control the opacity of a respectively associated window.

27. The dimmable window system of claim 15, wherein said at least certain of said control circuits includes a programmable processor that is responsive to said wireless control signals broadcast from said central controller to set control limits on control of said level of opacity of a respectively associated window, said programmable processor comprising instructions stored in processor-readable memory.

28. The dimmable window system of claim 15, wherein the vehicle is an aircraft.

29. A dimmable aircraft window system, comprising:
at least one window having electrically controllable opacity;
an electrical power storage device for supplying electrical power used to control the opacity of the window; and,
a control circuit coupled with the window and the storage device for controlling the level of opacity of the window;
said control circuit comprises a first wireless transceiver onboard said aircraft, said first wireless transceiver adapted for two-way full duplex wireless communication with a central controller onboard said aircraft, said central controller comprising a second wireless transceiver, said central controller operable to produce wireless control signals to remotely control the level of opacity of the window, said control circuit operable to transmit operational status and location information comprising an associated window to said central controller; and,
said control circuit further comprises a programmable processor responsive to the wireless control signals for controlling the opacity of the window, said programmable processor programmed to temporarily power up said first transceiver to periodically check for said wireless control signals from said central controller, said programmable processor comprising instructions stored in processor-readable memory.

30. The dimmable window system of claim 29, wherein the control, circuit includes means for sensing the level of opacity of the window.

31. The dimmable window system of claim 29, wherein said programmable processor is responsive to said wireless control signals from said central controller to set limits on the control of said level of opacity of the window.

32. The dimmable window system of claim 29, wherein the control circuit includes a power conditioning circuit for conditioning the electrical power drawn from the power storage device to control the opacity of the window.

* * * * *